United States Patent [19]

Baynes

[11] Patent Number: 4,860,423

[45] Date of Patent: Aug. 29, 1989

[54] METHOD OF MOUNTING AND REGULATING A VEHICLE OPENING DEVICE UTILIZING A WINDER

[75] Inventor: Dennis Baynes, Longford, Great Britain

[73] Assignee: General Motors Corporation, Detroit, Mich.

[21] Appl. No.: 245,092

[22] Filed: Sep. 16, 1988

Related U.S. Application Data

[62] Division of Ser. No. 897,499, Aug. 18, 1986.

[51] Int. Cl.[4] .............................................. B23P 11/00

[52] U.S. Cl. ..................................... 29/434; 29/525.1; 74/547; 296/223; 464/160

[58] Field of Search ............... 29/434, 525.1; 296/223, 296/224; 74/548, 528, 547; 70/42; 464/160; 292/347, DIG. 62; 267/160

[56] References Cited

U.S. PATENT DOCUMENTS

| | | | |
|---|---|---|---|
| 2,657,083 | 10/1953 | Krohm | 29/434 UX |
| 3,088,430 | 5/1963 | Champney | 29/434 X |
| 3,383,945 | 5/1968 | Carella | 74/547 |
| 3,601,883 | 8/1971 | Arlauskas | 29/434 |
| 4,515,037 | 5/1985 | Block | 74/548 X |

*Primary Examiner*—Charlie T. Moon
*Attorney, Agent, or Firm*—Ernest E. Helms

[57] ABSTRACT

The present disclosure provides a vehicle window or like opening device regulator retractable winder apparatus and method of utilization of the same. The present disclosure provides a mounting plate rotatable along a first rotational axis and having rotatably mounted thereto a winder handle which is rotatable along a second rotational axis at an angle with the first rotational axis. The handle is allowed relative rotation with the mounting plate between two angular positions whereby rotation past either angular position will cause the handle to rotate along the first rotational axis. The handle in a preferred embodiment is biased into a recessed nonextended position when not in use.

2 Claims, 1 Drawing Sheet

METHOD OF MOUNTING AND REGULATING A VEHICLE OPENING DEVICE UTILIZING A WINDER

This is a division of application Ser. No. 897,499, filed on Aug. 18, 1986.

FIELD OF THE INVENTION

The present invention relates to winders used for manual actuation of an opening device in a vehicle. More particularly the present invention relates to retractable hand winders used in automotive vehicles for actuating the regulating mechanism of an opening device such as a window or sliding roof.

DISCLOSURE STATEMENT

Retractable regulator winders (often referred to as cranks) are presently available and are generally of the hinge type. The hinge type winder consists of two parts which are usually pivotally connected with one another. When not in use, this type of winder can be swung into a recess extending from the inner wall of the vehicle. An example of such a winder is shown in Carella U.S. Pat. No. 3,383,945, commonly assigned.

Hinge-type winders have often been undesirable however, due to their bipartite design which does not assure sufficiently dependable operation of the winder in some applications.

In an attempt to avoid the aforementioned disadvantages of window regulator winders a retractable winder of Treber et al. U.S. Pat. No. 3,517,571 was brought forth. However, Treber et al. requires the winder to be pulled out radially. It is a desire of the present invention to provide a retractable regulator winder wherein the motion bringing the winder crank (or handle) to an operating position is a circular motion more akin to the motion of the winder in its normal operative position.

DISCLOSURE STATEMENT

To overcome the above-noted and other problems the present invention is brought forth. The present invention provides a retractable vehicle regulator winder having a mounting plate rotatable in a first axis. The mounting plate is drivably connected with a window or sliding roof regulator apparatus. A handle is rotatably mounted to the mounting plate. The rotational axis of the handle with respect to the mounting plate is at an angle with the rotational axis of the mounting plate. The rotation of the handle, with respect to the mounting plate, is limited between first and second predetermined angular positions. Rotation of the handle beyond the first or second predetermined angular position causes rotation of the handle along the mounting plates axis of rotation. In a preferred embodiment of the present invention the handle is biased into a recessed portion of the mounting plate. Therefore, protrusion into the passenger compartment by the handle will be minimized or totally eliminated providing an aesthetically pleasing appearance to the vehicle interior.

It is an object of the present invention to provide a motor vehicle regulator retractable winder. It is a further object of the present invention to provide a method of regulating a vehicle opening device utilizing a retractable winder.

It is another object of the present invention to provide a vehicle opening device regulator winder in combination comprising a mounting plate rotatably mounted to said vehicle along a first rotational axis having a first portion projecting in a plane generally perpendicular to the first rotational axis and a second recessed portion projecting at an angle with the first portion and the mounting plate having a circular groove of less than 360 degrees, and a handle having a rotatably mounted extension, and the handle being rotatably mounted to the mounting plate along a second rotational axis at an angle with the first rotational axis and being biased to a third predetermined angular position to place the handle within the mounting plate second recessed portion and the handle having a pin projecting into the circular groove of the mounting plate such that said handle is relatively rotatable with respect to the mounting plate between first and second predetermined angular positions along the second rotational axis whereby rotation of the handle past the first or second predetermined angular position causes rotation of the handle along the first rotational axis and the handle extension to project generally parallel with the first rotational axis.

It is still yet another object of the present invention to provide a method of regulating a vehicle opening device utilizing a winder including rotatably mounting a mounting plate into the vehicle along a first rotational axis, rotatably mounting to the mounting plate a handle along a second rotational axis at an angle with the first rotational axis within first and second predetermined angular positions, biasing the handle to a third angular position, and angularly displacing the handle with respect to the mounting plate past the first or second angular position whereby the handle is rotating along the first rotational axis.

Other objects, desires and advantages of the present invention will become apparent to those skilled in the art as the nature of the invention is better understood from the accompanying drawings and a detailed description.

DETAILED DESCRIPTION OF THE DRAWINGS

Figure 1:
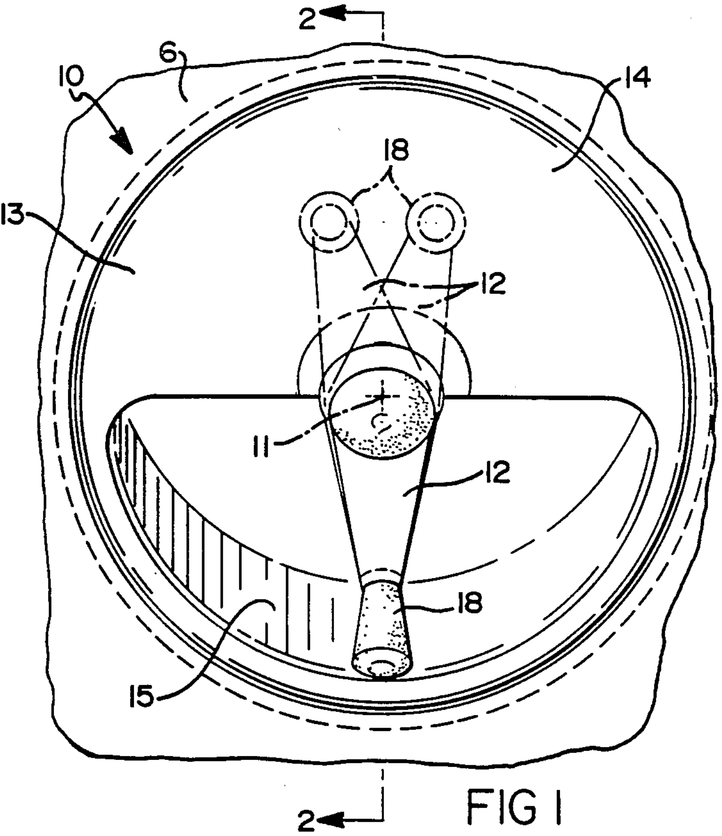
FIG. 1 is a front elevational view of a preferred embodiment of an automotive vehicle window regulator of the present invention.

Referring to FIGS. 1, 2, 3, and 4 the vehicle opening device regulator winder 10 of the present invention has two major components. The first component is the mounting plate 14 which is rotatably mounted in the vehicle. The second major element is the handle 12 which is rotatably mounted to the mounting plate 14.

The mounting plate 14 is usually positioned to be along the interior surface 6 of the vehicle. The mounting plate is rotatably mounted to the vehicle along a first rotational axis 11 and is connected at its end opposite the handle to a gear-train 8 which translates the opening device (window not shown) up and down.

The mounting plate 14 has a circular shape allowing it to be inserted into a circular opening in the vehicle wall or door. Although not required, the mounting plate 14 has projecting radially outward planer first 13 and second 15 portions. The first portion 13 is generally coplanar with the interior surface 6 of the vehicle compartment and generally projects in a plane perpendicular to the first rotational axis 11. The second portion 15 of the mounting plate projects in a plane at an angle from the first portion 13 and is recessed to receive the handle 12. The face of the mounting plate facing the handle 12 has a circular groove 26 extending for less than 360 degrees.

Rotatably mounted to the mounting plate 14 by a mounting pin 24 is the handle 12. The handle rotates in a second rotational axis 22 which is at an angle with the first rotational axis 11 of the mounting plate and preferably intersects with the first rotational axis 11. The handle has an attached pin 16 projecting toward the mounting plate 14 captured within the circular groove 26. The ends 41 and 42 of circular groove 26 provide the first and second predetermined angular positional limits of the relative rotation of handle 12 with respect to mounting plate 14.

Figure 2:
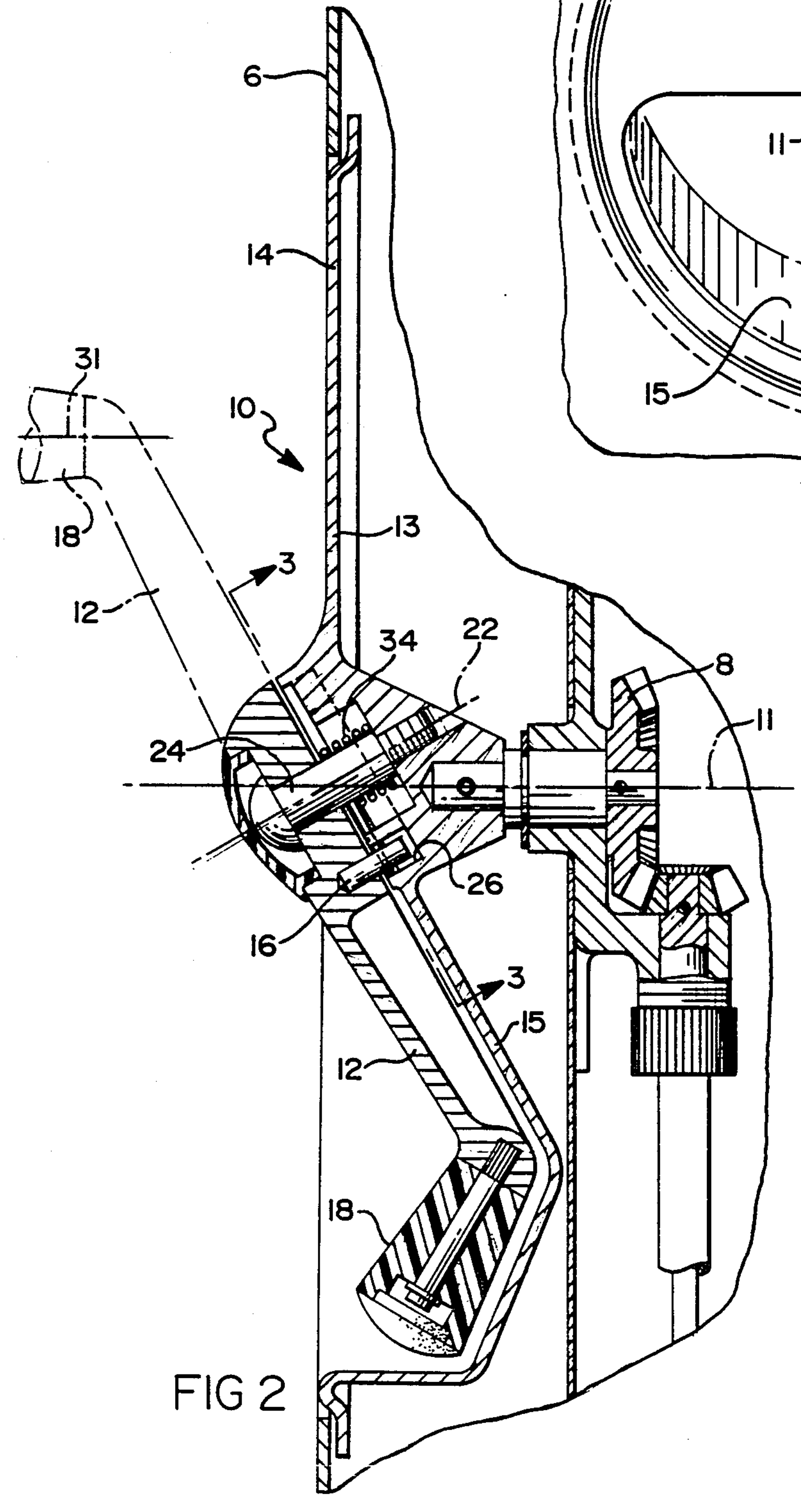
FIG. 2 is a sectional view taken along line 2—2 of FIG. 1.
Figure 3:
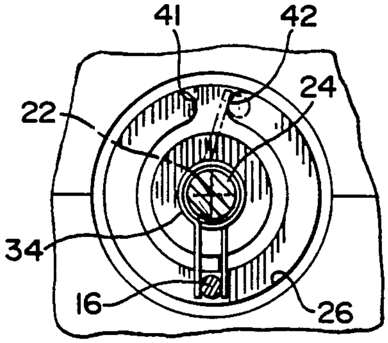
FIG. 3 is a sectional view taken along line 3—3 of FIG. 2 with the winder handle in the solid line position.
Figure 4:
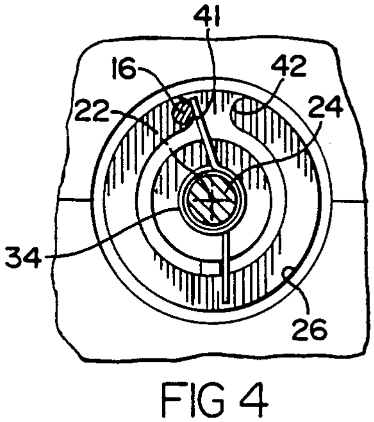
FIG. 4 is a sectional view taken along line 3—3 of FIG. 2 with the winder handle in the phantom position.

A torsional spring 34 is provided underneath the handle 12 to bias the handle 14 into a third predetermined angular position (solid line FIGS. 1 and 2). The handle will usually be biased to position itself along the second portion 15 of the mounting plate.

In operation, the vehicle occupant will grab the handle 14 by its angularly attached handle extension 18 and rotate the handle 12 relative to the mounting plate 14 until the pin 26 makes contact with the end 41 (FIG. 4) or 42 (FIG. 3 phantom) of the circular groove 26. The above will bring the handle 12 to a nonretracted position (phantom FIGS. 1, 2). As the handle 12 is further turned, the handle and the mounting plate 14 will rotate along the first rotational axis 11.

In order to provide greater ease in operation, the handle has an extension 18 at an angle with the handle 12 which is also rotatable with respect to the handle 12. The handle extension 18 projects along a rotational axis 31 generally parallel with the first rotational axis 11 of the mounting plate 14 when the handle 12 is rotated past its first or second predetermined angular limit. Upon release of the handle 12 by the vehicle occupant, the handle 12 by virtue of the torsion spring 34 will automatically be retracted back to the second portion 15. The handle 12 will reach the second portion 15 which is recessed regardless of the orientation of the mounting plate 14. It is apparent to those skilled in the art that the projecting portions 13 and 15 of the mounting plate 14 may be deleted if desired.

The present invention provides a method of regulating a vehicle window utilizing a retractable winder 10 which includes the following steps:

1. Rotatably mounting a mounting plate 14 into the vehicle along a first rotational axis 11;
2. Rotatably mounting to the mounting plate 14 a handle 12 along a second rotational axis 22 at an angle with the first rotational axis 11 within first 41 and second 42 predetermined angular positions;
3. Angularly displacing the handle with respect to the mounting plate 14 past a first 41 or second 42 predetermined angular position whereby the handle 12 is rotating along the first rotational axis 11.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A method of regulating a vehicle opening device utilizing a winder, said method in combination comprising:
- rotatably mounting a mounting plate into the vehicle along a first rotational axis;
- rotatably mounting to said mounting plate a handle along a second rotational axis at an intersecting angle with the first rotational axis within first and second predetermined angular positions; and
- angularly displacing said handle with respect to said mounting plate past said first or second predetermined angular position whereby said handle is rotating along said first rotational axis.

2. A method as described in claim 1 further including biasing said handle to a third predetermined angular position with respect to said mounting plate along said second rotational axis.

* * * * *